(12) United States Patent
Liou et al.

(10) Patent No.: US 6,481,628 B2
(45) Date of Patent: Nov. 19, 2002

(54) PEN-TYPE BARCODE SCANNER

(76) Inventors: Kenneth Liou, 9F, No. 108-3, Min-Chuan Rd., Hsin-Tien, Taipei Hsien (TW); Ho-Yeh Yu, 9F, No. 108-3, Min-Chuan Rd., Hsin-Tien, Taipei Hsien (TW)

( * ) Notice: Subject to any disclaimer, the term of this patent is extended or adjusted under 35 U.S.C. 154(b) by 0 days.

(21) Appl. No.: 09/828,799

(22) Filed: Apr. 10, 2001

(65) Prior Publication Data

US 2002/0145048 A1 Oct. 10, 2002

(51) Int. Cl.[7] .................................................. G06K 7/10
(52) U.S. Cl. .............................. 235/472.03; 235/472.01
(58) Field of Search ........................ 235/472.03, 472.01

(56) References Cited

U.S. PATENT DOCUMENTS 6,119,944 A * 9/2000 Mulla et al. ........... 235/472.03

FOREIGN PATENT DOCUMENTS

GB 2312188 * 10/1997

* cited by examiner

Primary Examiner—Harold I. Pitts
(74) Attorney, Agent, or Firm—Birch, Stewart, Kolasch & Birch, LLP

(57) ABSTRACT

A pen-type barcode scanner for reading barcode image carried by an object. The barcode scanner features brightened and concentrated reflected light reflecting from the barcode image thereby benefiting a more reliable inlet signal. In addition, the energy used can be saved while the reliability is increased. The barcode scanner features a light source device, i.e. an LED chip, which is located on a light path adjacent to an approaching end. By this arrangement, the emitted light can be completely projected onto the barcode image thereby enhancing a reflected light from the barcode. Accordingly, the reflected light can be readily processed to decode the information carried by the barcode.

5 Claims, 6 Drawing Sheets

PEN-TYPE BARCODE SCANNER

FIELD OF THE INVENTION

The present invention relates to a barcode scanner, and more particularly to a pen-type barcode scanner which features energy saving while increasing the performance.

DESCRIPTION OF THE PRIOR ART

The barcode has been widely and intensively used in merchandise It classifications, inventory management because it can be readily recognized, a great deal of diversity. In addition, the barcode can be readily processed by electronic equipments. A plurality of barcode scanners has been marketed to meet different usage. For example, a platform barcode scanner is widely used in the supermarket for checkout of different merchandises, while a pen-type barcode scanner is used to read barcode carried on a label.

Referring to FIGS. 1 and 2A, a conventional pen-type barcode scanner 1 includes a cylindrical housing 10 having a signal cable 2 connected at an end thereof. The cylindrical housing 10 further includes an approaching end 101 in which a convex lens and an aperture are defined. The cylindrical housing 10 is incorporated with a scanning assembly 11 including a plastic member 111 having a central passage 112 defined therein. The plastic member 111 is further provided with a light source 113, a focusing device 114, a signal receiving/converting device 115 and a printed circuit board 116. The light source 113 is configured by a plurality of LED symmetrically arranged on an end surface of the plastic member 111.

When a barcode is to be scanned, the light source 113 is switched and provides an emitted light beam passing through the lens (aperture) of the approaching end 101 of the cylindrical housing 10. A reflected light beam from the barcode is then picked up through the lens (aperture) of the approaching end 101. The reflected light beam is firstly focused by the focusing device 114, and then transferred to the signal receiving/converting device 115 after the light beam is enhanced by the focusing device 114. The reflected light beam is converted into an electrical signal by the printed circuit board 116 together with the receiving/converting device 115. Then a processed signal can be transmitted to other electronic device for further processing.

However, the conventional pen-type barcode scanner encounters a light diffusion on the projected light beam. Not only will the reflected light beam be negatively influenced, but will also exhaust more energy.

The main defect of the conventional barcode scanner is that the light intensity of the light source, i.e. the LED, is not strong enough such that the intensity of the reflected light beam is too weak to be decoded by the receiving/converting device 115. As a result, the information contained within the reflected light beam from the barcode can not be accurately retrieved. Accordingly, in order to compensate this insufficient intensity, the power supplied to the LED should be increased and more energy is exhausted.

The other reason for why the conventional barcode scanner can not get a strong reflected light beam is because of the arrangement of the LED 113. As shown in FIG. 2A, the LEDs 113 are arranged on the front end surface of the plastic member 111 and which are located in the front of the focusing device 114. As a result, when light beams projected from the LEDs 113 have a comparable larger inlet angle θ which inevitably creates light diffusion. Consequently, the intensity of the light beams projected toward the barcode is accordingly attenuated. On the other hand, the LEDs 113 are distant to the aperture (lens) of the approaching end 101. As a result, the light beams can reach thereof after a plurality of reflections which will also attenuate the intensity of the light beams. Again, in order to compensate this defect, the power and number of the LEDs 113 have to be increased and which inevitably increase the cost of the barcode scanner. As clearly shown in FIG. 2B, there are four LEDs used in the conventional barcode scanner. Not only will increase the complexity of the overall structure, but will also increase the cost. As such, there is still a room to provide an improved barcode scanner to meet the market requirement.

SUMMARY OF THE INVENTION

An object of this invention is to provide a pen-type barcode scanner which features a reduced light travel path between a light source device and a barcode to be read. The emitted light beam can profoundly be projected onto the barcode via a reduced inlet angle thereby benefiting enhanced reflected light. Accordingly, the decoding of the barcode can be readily performed.

According to one aspect of the present invention, the light source device is a single LED device thereby simplifying the overall structure of the barcode scanner.

In order to achieve the objects set forth, a barcode scanner for reading barcode image carried by an object in accordance with the present invention comprises a cylindrical housing having a barcode approaching end and an output end opposite to the approaching end, and a scanning apparatus located within the housing.

The scanning apparatus includes a focusing device, a light source device, a signal receiving/converting device, and a printed circuit board carrying the devices. The focusing device is located in a central line passing a center of an aperture located in the approaching end and on while a lens is seated.

According to one of the aspects of the present invention, the light source device is located to a central line and is more closer to the barcode thereby the projected light beam can be projected toward the barcode along a reduced inlet angle. Consequently, light diffusion and loss can be largely reduced thereby providing an enhanced reflected light. The accuracy and performance can therefore increased.

According to another aspect of the present invention, the scanning performance is largely increased by approaching the light source device to the barcode to be scanned thereby simplifying the overall structure. As a result, the barcode scanner in accordance with the present invention can be easily manufactured.

BRIEF DESCRIPTION OF THE DRAWINGS

Other objects and advantages of the present invention will become apparent from the following detailed description of the preferred embodiments thereof taken in conjunction with the accompanying drawings wherein.

DETAILED DESCRIPTION OF PREFERRED EMBODIMENT

Figure 1:
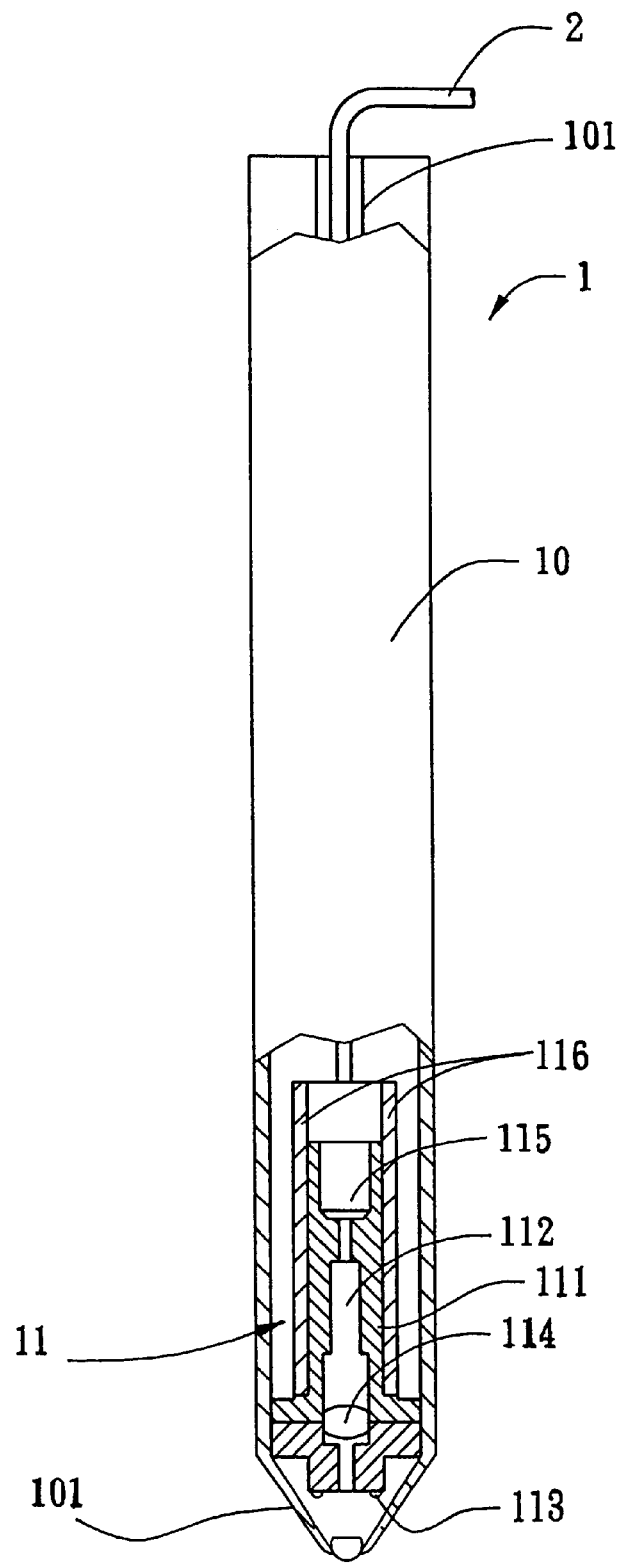
FIG. 1 is a plan view of a conventional pen-type barcode scanner.
Figure 2A:
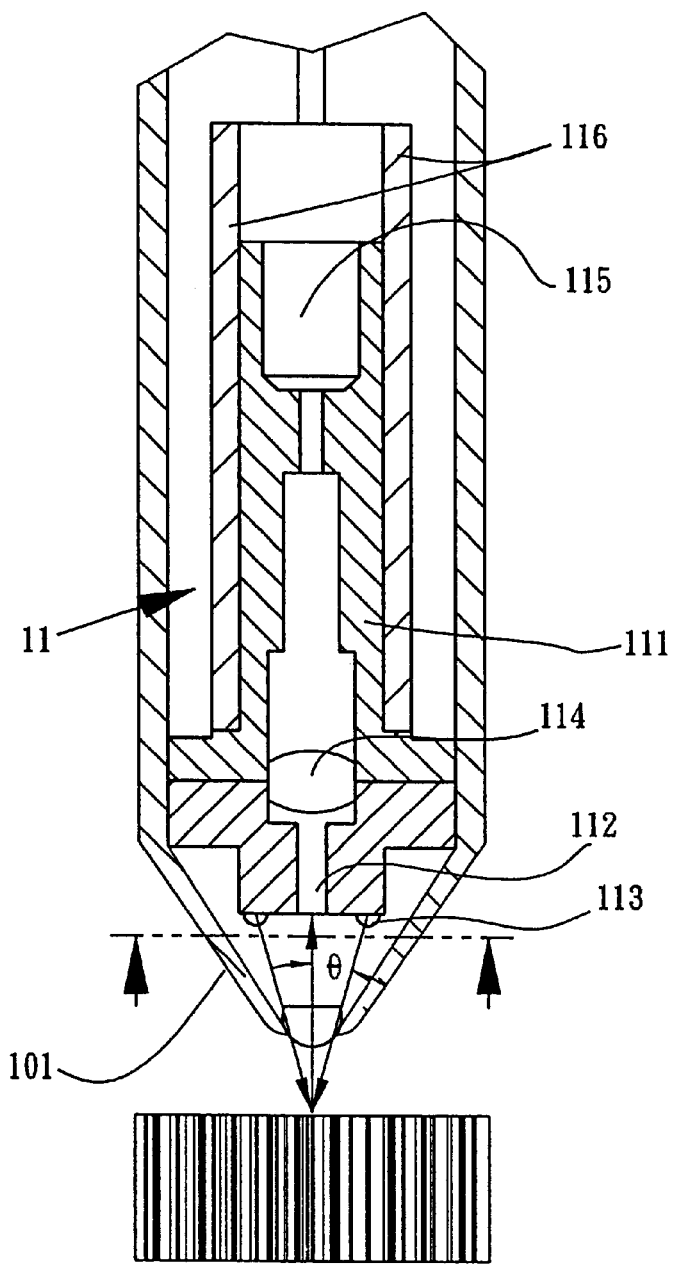
FIG. 2A is an enlarged assembled view of the pen-type barcode scanner of FIG. 1.
Figure 2B:
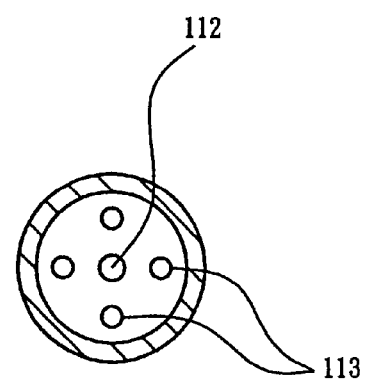
FIG. 2B is a bottom view of light source of FIG. 1.
Figure 3:
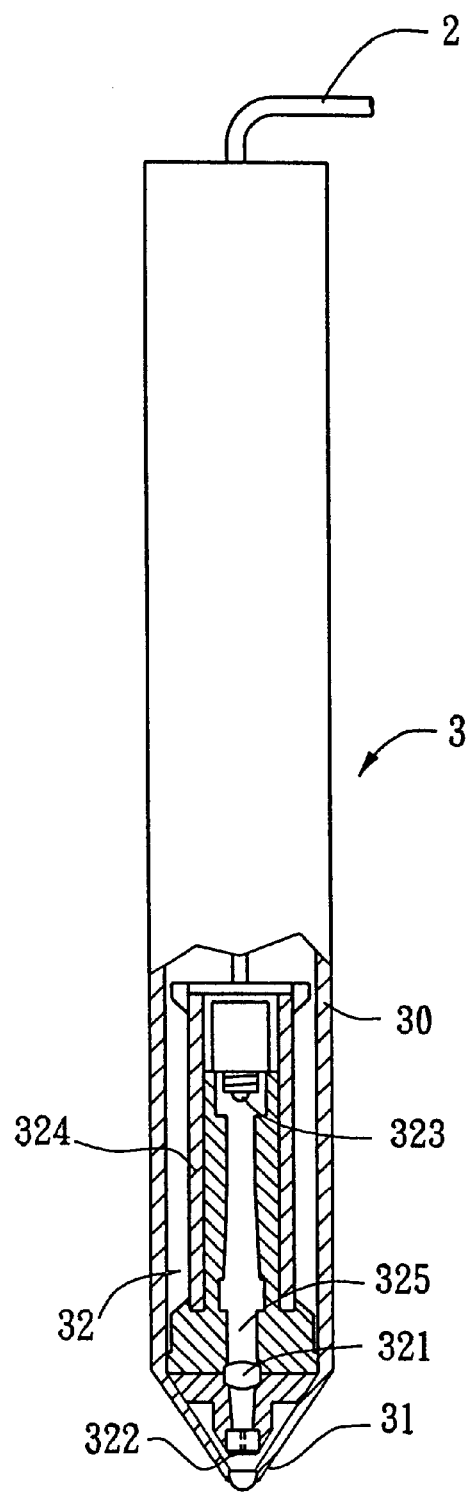
FIG. 3 is a cross sectional view of a pen-type barcode scanner in accordance with the present invention.
Figure 4A:
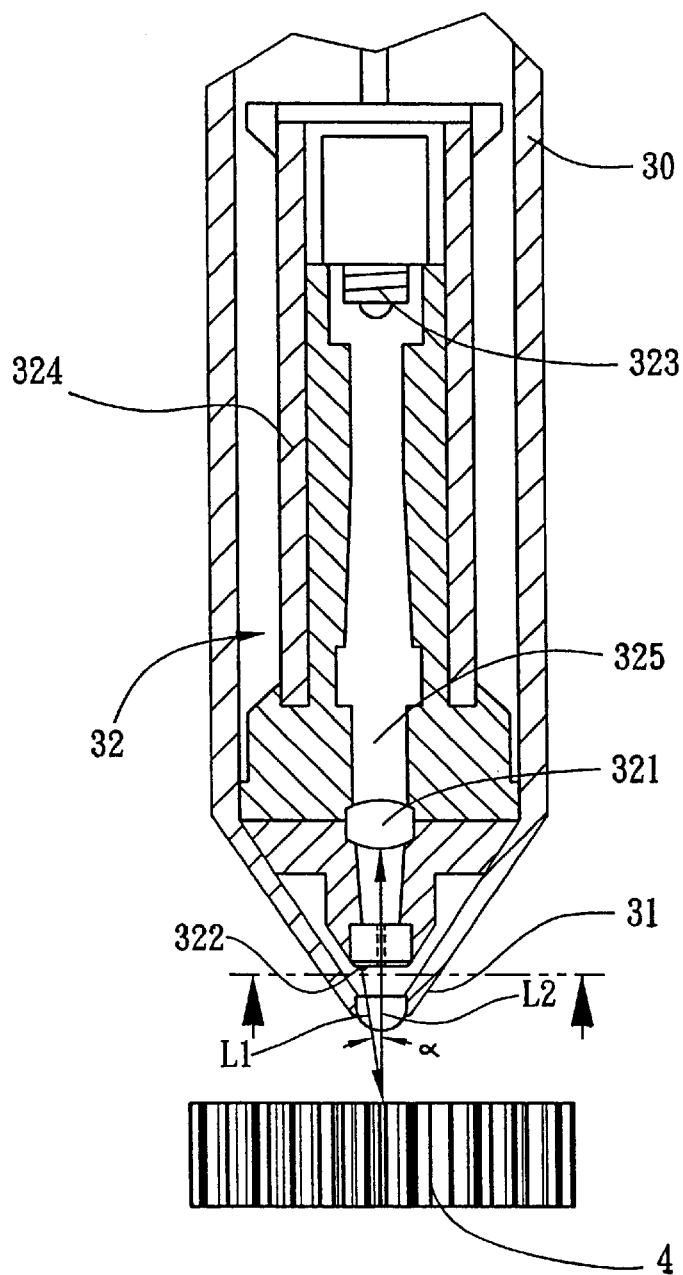
FIGS. 4A, 4B are enlarged and bottom views of a scanning assembly in accordance with the present invention.
Figure 4B:
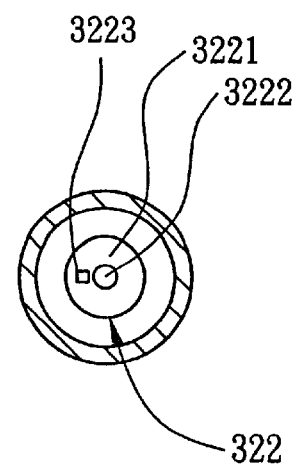

Referring to FIGS. 4A and 4B, a pen-type barcode scanner 3 in accordance with the present invention includes a cylindrical housing 30 defining a cone-shaped approaching end 31. A scanning apparatus 32 is arranged adjacent to the approaching end 31. The approaching end 31 is used to approach a barcode 4 carried by an object and pick up a reflected image of the barcode 4. The approaching end 31 further defines an aperture therein and. a convex lens is seated therein (not labeled). The convex lens is used to enhance and concentrate a light beam passing therethrough. The scanning apparatus 32 includes a focusing device 321, a light source device 322, a signal receiving/converting device 323, and a printed circuit board 324 carrying those devices. The focusing device 321 and the signal receiving/converting device 323 are arranged in a central line which passes through a center of the aperture and the lens seated in the aperture. A light channel 325 is defined along the central line. The focusing device 321 is arranged in a middle portion of the light channel 325. Accordingly, the light beam passes therethrough can be then properly focused and concentrated. In addition, the lens can also enhance and concentrate a reflected light beam picked from the approaching end 31. The reflected light beam is projected from the light source device 322 toward the barcode, and then reflected from the barcode and picked up by the approaching end 31. The reflected light beam is then enhanced and concentrated by the convex lens, and then transmitted to the signal receiving/converting device 323. The signal receiving/converting device 323 is configured by an optical transistor which processes the reflected light beam signal enhanced by the focusing device 321. Afterward, the processed signal is then transmitted to the printed circuit board 324 for further processing. According to the preferred embodiment, a digital signal will be finally achieved for further processing of other electrical equipment. An end of the printed circuit board 324 can be electrically connected to a cable which extends outward from another end of the cylindrical housing 30. The cable can further connected to electrical equipment.

Figure 5:
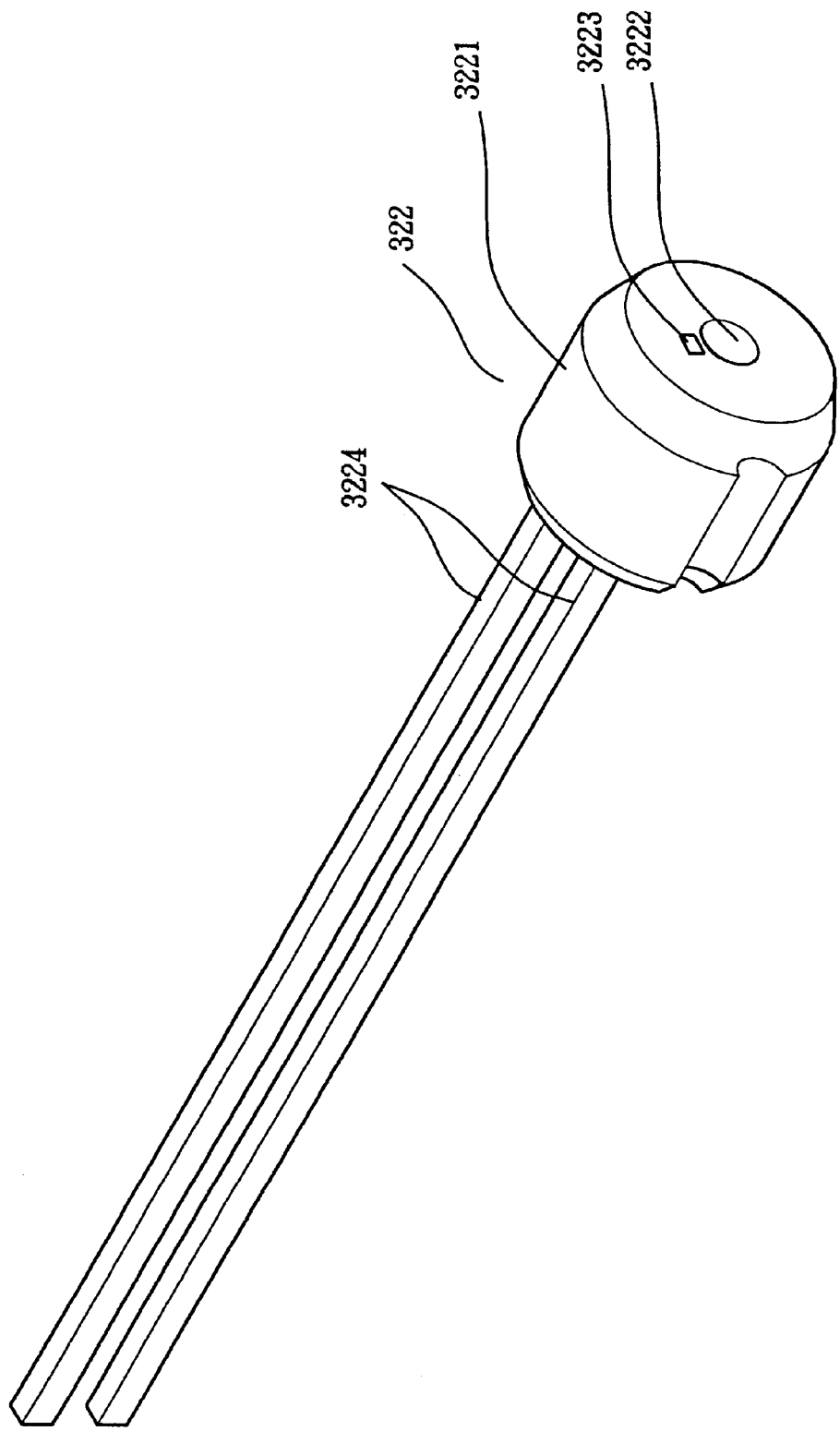
FIG. 5 is a perspective view of a light source device in accordance with the present invention.

The light source device 322 is configured by an LED chip which is arranged adjacent to the central line of the cylindrical housing 30. According to the preferred embodiment, the light source device 322 is arranged closer to the aperture (lens) of the approaching end 31. As clearly shown in FIGS. 4B and 5, the light source device 322 includes a core member 3221 in which an emitting aperture 3222 is defined therein. The LED chip 3223 is then disposed adjacent to the emitting aperture 3222. Legs 3224 of the LED chip 3223 extend rearward from the core member 3221 to form a unit. In assembling, the core member 3221 is attached to the scanning apparatus 322 such that the emitting aperture 3222 is accurately aligned with the central line of the cylindrical housing 30, while the legs 3224 are electrically soldered to the printed circuit board 324.

Since the light source device 322 is located adjacent to the central line of the cylindrical housing 20 and is closer to the aperture of the approaching end 31. Accordingly, when a light beam is emitted from the light source device 322, the emitted light beam can be correctly projected toward the barcode 4 from the aperture (lens) of the approaching end 31.

As shown in FIG. 4A, when a scanning process is to be commenced, the barcode scanner 3 is switched on such that a light beam L1 is emitted from the light IS source device 322. Because the light source device 322 is close and adjacent to the central line of the cylindrical housing 30 and the barcode 3, a smaller inlet angle a is attained. Accordingly, most of the light beams L1 can pass through the aperture (lens) of the approaching end 31 and then projecting toward the barcode 4. Consequently, an enhanced reflecting light from the barcode 4 is achieved. In addition, the reflected light beam L2 has almost the same intensity of the original light beam L1 and then passes through light channel 325 and the focusing device 321. The reflected light beam L2 finally reaches to the receiving/converting device 323 for further processing. The processed signal is then transferred to the printed circuit board 324 for further processed. According to the preferred embodiment, a digital signal is then reached after the processing and the digital signal can be further processed by other electrical equipment. The processed signal can then further processed to have the format of the keyboard, RS232, and the USB. According to the preferred embodiment, the processed signal can be readily shown on a monitor of a computer.

By the arrangement, the pen-type barcode scanner 3 provides steady light source 322 such that a scanning light beam L1 of smaller inlet angle can be attained. This scanning light beam L1 can efficiently project toward the barcode 4 such that the reflected light beam L2 from the barcode 4 has the intensity almost the same of the original light beam L1. Consequently, with the enhanced reflected light beam L2, the information carried by the barcode 4 can be accurately decoded.

Figure 6:
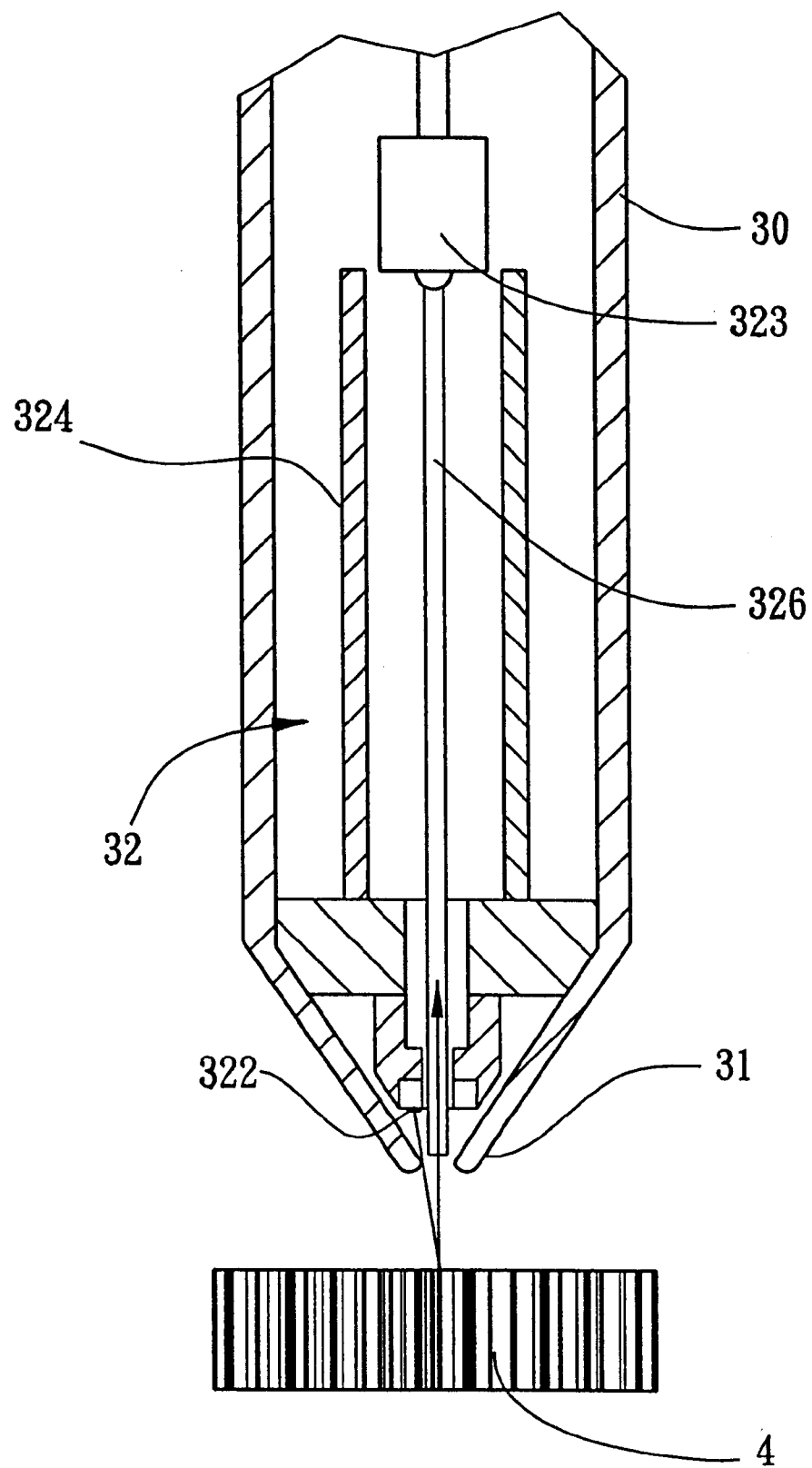
FIG. 6 is a second embodiment of a barcode scanner in accordance with the present invention.

Referring to FIG. 6, the focusing device 321 can be directly replaced by a fiber 326 which efficiently transmits the reflected light beam L2 to the receiving/converting device 323. In addition, by the provision of the fiber, the overall configuration can be further simplified since the lens is omitted.

While specific illustrated embodiments have been shown and described, it will be appreciated by those skilled in the-art that various modifications, changes, and additions can be made to the invention without departing from the spirit and scope thereof as set forth in the following claims.

We claim:

1. A barcode scanner for reading barcode image carried by an object, comprising:
    a cylindrical housing having a barcode approaching end and an output end opposite to said approaching end, and a scanning apparatus located within said housing;
    said scanning apparatus including a focusing device, a light source device, a signal receiving/converting device, and a printed circuit board carrying said devices, said focusing device and signal receiving/converting device being located in a central line passing a center of an aperture located in said approaching end and on while said a lens is seated, wherein reflected barcode image is picked up by said focusing device, and then transferred to said receiving/converting device in which said reflected barcode image is processed, a processed signal then being forwarded to said printed circuit board and converted into a digital signal for further processing; and
    wherein said light source device is configured by a LED chip which is located aside said central line and between said approaching end and said signal receiving/converting device.

2. The barcode scanner as recited in claim 1, wherein said LED chip is closer to said aperture in which said lens is seated.

3. The barcode scanner as recited in claim 1, wherein said focusing device is a convex lens located between said approaching end and said receiving/converting device.

4. The barcode scanner as recited in claim 1, wherein said focusing device is a fiber element which directly interconnects said approaching end and said receiving/converting device.

5. The barcode scanner as recited in claim 1, wherein said light source device includes a core member in which an emitting aperture is defined, said LED chip being located on said core member adjacent to said emitting aperture, legs of said LED chip extending rearward from said core member.

* * * * *